Figure 2:
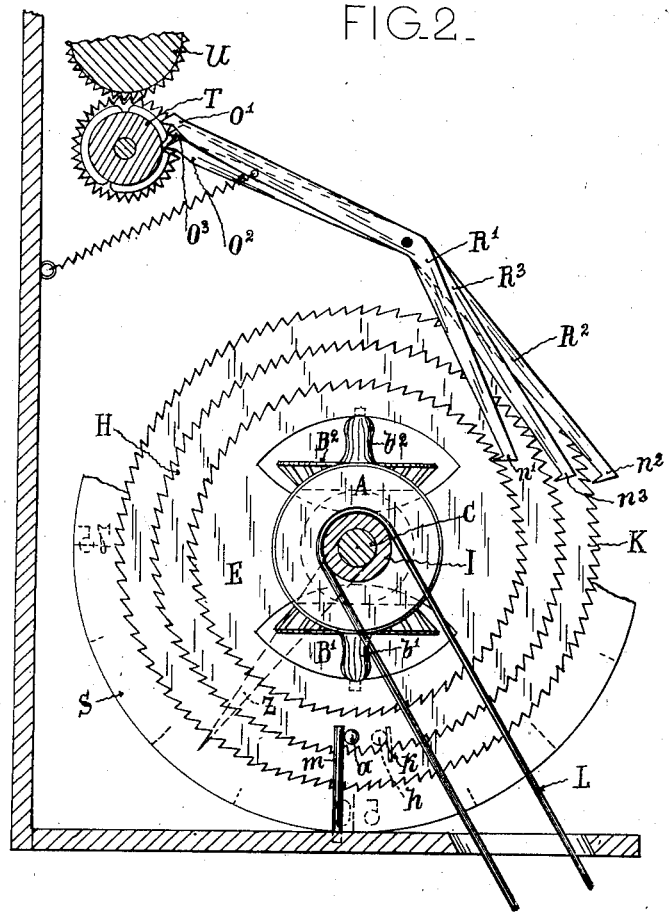

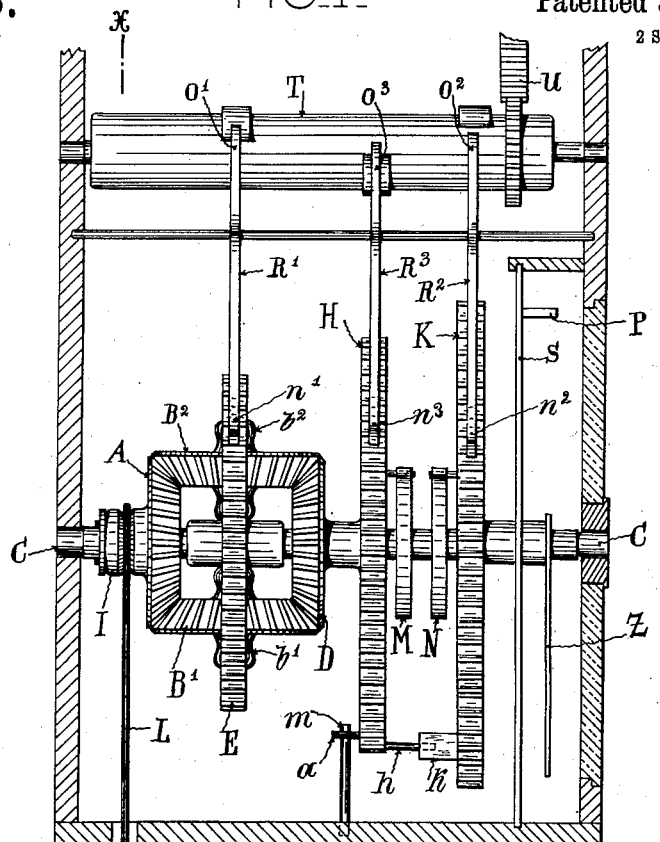
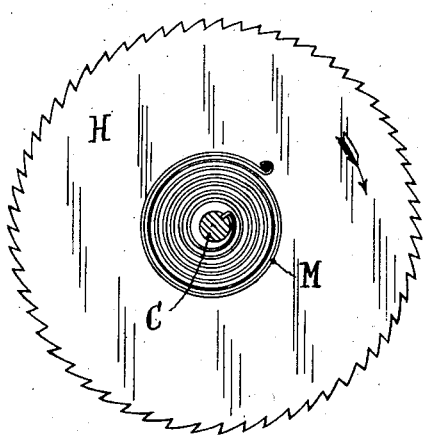

H. DAHL & M. MARTIN.
SPEED INDICATOR.
APPLICATION FILED NOV. 9, 1906.

928,635.

Patented July 20, 1909.
2 SHEETS—SHEET 2.

Witnesses.

Inventors.
Hans Dahl
Max Martin

UNITED STATES PATENT OFFICE.

HANS DAHL AND MAX MARTIN, OF BERLIN, GERMANY; SAID MARTIN ASSIGNOR TO SAID DAHL.

SPEED-INDICATOR.

No. 928,635.    Specification of Letters Patent.    Patented July 20, 1909.

Application filed November 9, 1906. Serial No. 342,726.

*To all whom it may concern:*

Be it known that we, HANS DAHL, a subject of the King of Norway, and MAX MARTIN, a subject of the German Emperor, both residents of Berlin, in the Kingdom of Prussia and German Empire, have invented new and useful Improvements in Speed-Indicators, of which the following is a specification.

Our invention relates to an improved speed indicator, in which the speed to be indicated is transmitted by planet gears to a pointer with the aid of arrested ratchet wheels, which are temporarily released. The interval of time is determined by a clockwork or the like.

Through the rotary motion of the shaft or other body whose speed is to be indicated a loosely mounted ratchet wheel is arrested by suitable means, however, the planet gears transmit their motion to a second ratchet wheel, which makes the same angular motion and rotates another ratchet wheel provided with a pointer. The two last ratchet wheels are released in succession, for instance by a clockwork or the like, and are thereupon retracted by controlling springs. The release of the wheels takes place in succession, so that the pointer wheel has already assumed its position before the other wheel is released; and the latter wheel will prevent the pointer wheel from returning into the zero position, and at the next operation the pointer wheel may turn still farther forward. With increasing speed the angular velocity in the given interval of time is greater than before, and the devices turn through a greater angle. The increasing extents of turning are indicated by a further throw of the pointer. With decreasing speed the angular velocity is smaller and therefore the extent of turning of the ratchet wheel will also be smaller than the previous extent. The ratchet wheel thus no longer reaches the pointer wheel and the latter is retracted on release, returning to the first wheel. The pointer wheel can not pass the ratchet wheel and therefore assumes the position determined by the said ratchet wheel. This latter, on the other hand returns at each time of release into the zero position and is thus on each occasion brought anew from zero into its former or into a new angular position. If the motion of the shaft is interrupted both wheels return into their initial position.

Our invention consists essentially in the combination of planet gear with ratchet wheels for setting the pointer, said wheels being influenced temporarily by the speed to be indicated and then released.

One form of construction of the new apparatus is illustrated in the accompanying drawings in which—

Figure 4:
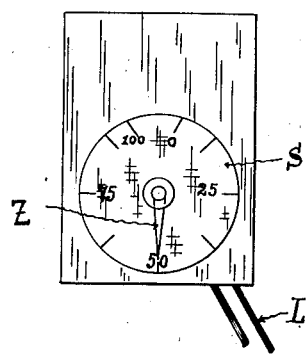

Figure 1 is a side elevation the casing being shown in section; Fig. 2 a rear elevation and part section on line $x$ $y$ of Fig. 1. Fig. 3 shows a detail of a ratchet wheel and spiral spring to be hereinafter referred to; Fig. 4 is a front elevation of the entire instrument, drawn on a smaller scale.

C is a rigid shaft on which the ratchet wheels, gears and other devices are loosely mounted. On the shaft I whose speed is to be indicated and which is driven by the strap L there is mounted the bevel gear A, adjacent to which is loosely mounted the ratchet wheel E. In the latter are mounted two planet gears $B^1$ $B^2$, $b^1$ $b^2$ being their bosses, said gears meshing with the bevel gear A. On the shaft C there is likewise loosely mounted a bevel gear D, the boss of which connects it with the ratchet wheel H. The latter is furnished on one side with a stop $a$, which strikes the pin $m$ or the like, fixed to the framework, and on the other side with a projection $h$. The ratchet wheel H is acted upon by a spiral spring M, which is so arranged as to be wound up on advance of the wheel, Fig. 3. Adjacent to this ratchet wheel H is a ratchet wheel K which is controlled by the spiral spring N and is coupled with the pointer Z, which in its zero position lies against the pin P of the scale disk S.

T is a cam cylinder rotated by a time measuring device, such for instance as an ordinary clockwork or the like, here represented by the fragment of a gear V. On the rim of the disk T there lie the ends $O^1$ $O^2$ $O^3$ of the levers $R^1$ $R^2$ $R^3$, which at a given time are set in operation by the cams on the cylinder. Hereupon the pawl end $n^1$ of the spring actuated lever $R^1$ engages the ratchet wheel E and arrests it so long as the cam acts.

The pawl ends $n^2$ $n^3$ of the spring actuated levers $R^2$ $R^3$ engage with the ratchet wheels K and H respectively and hold them, but the wheels are released on the cams of the disk T lifting the lever ends $O^2$ $O^3$. The indicator Z moves over the scale on the disk S.

The operation of the apparatus is as follows:—The bevel gears A D mesh with the planet gears $B^1$ $B^2$, which can rotate on their axes and simultaneously turn with the ratchet wheel E. Owing to the latter being mounted loosely on the shaft C, the gear D and the ratchet wheel H will remain stationary and the projection $a$ merely rests against the pin $m$, and the projection $h$ against the projection $k$ of the ratchet wheel K. The pointer Z is in the zero position. The two ratchet wheels K H are held by the pawl ends $n^2$ $n^3$ of the levers $R^2$ $R^3$, while the ratchet wheel E is not engaged by the pawl end $n^1$ of the lever $R^1$. The clockwork drives the cylinder T, and when the cams of the cylinder come under the lever end $O^1$ of lever $R^1$ the pawl end $n^1$ of this lever will engage with the ratchet wheel E and prevent its further rotation. The two planet gears $B^1$ $B^2$ now transmit the motion of the wheel A to the gear D. The latter is thus rotated, together with the ratchet wheel H, which turns freely below the pawl end $n^3$ of the lever $R^3$. The projection $h$ engaging with the projection $k$ on the ratchet wheel K, the latter is rotated in the same direction as the wheel H and with the same angular velocity. The ratchet wheel K turns unobstructed by the pawl end $n^2$ of the lever $R^2$. The cams of the cylinder T now lift the lever ends $O^2$ $O^3$ in succession, and thus retract the pawl ends $n^2$ $n^3$ of the levers $R^2$ $R^3$ from the ratchet wheels K H, the ratchet wheel E having been already released by the pawl end $n^1$. The ratchet wheels K H are then retracted by their respective springs N M. The wheel K can only return so far as the pin $h$ of the wheel H allows; while the wheel H returns each time into the zero position. After these positions have been assumed the action of the gear wheel A commences anew. According to the speed within the definite intervals of time, corresponding to the length of the cams of the cylinder T, the wheels are caused to turn through a larger or smaller angle, and this will be larger the greater the speed to be indicated. With increasing speed the extent of rotation of the ratchet wheels H K and pointer Z will continually increase, while with decreasing speed the extent of rotation will always become smaller.
The projection $h$ of the wheel H will, in the first case push the projection $k$ of the wheel K always forward; in the second case it will not reach the projection $k$, so that the wheel K always recedes more and more, approaching the zero position.

For this apparatus it is not necessary that the vehicle, shaft or the like whose speed is to be indicated move at a high speed, on the contrary the device will operate even at a very low speed of the vehicle or the like.

Having thus described our invention, what we claim as new and desire to secure by Letters Patent is—

Speed indicating apparatus, comprising in combination, a shaft and a bevel gear rotated by the body whose speed is to be indicated; a rigid shaft; a ratchet wheel loosely mounted on the rigid shaft, and planet gears mounted in the ratchet wheel and meshing with the said bevel gear; a second bevel gear loosely mounted on the rigid shaft and meshing with the planet gears; a spring controlled ratchet wheel rigidly connected with the second said bevel gear; a spring controlled, ratchet wheel loosely mounted on the rigid shaft and provided with a pointer and actuated and controlled by the said second ratchet wheel; spring actuated pawls adapted to engage with the three said ratchet wheels; and means for actuating the pawls in succession; substantially as described.

In witness whereof we have hereunto signed our names this twenty seventh day of October 1906, in the presence of two subscribing witnesses.

HANS DAHL.
MAX MARTIN.

Witnesses:
  WOLDEMAR HAUPT,
  HENRY HASPER.